(12) United States Patent
Sasaki et al.

(10) Patent No.: US 7,414,376 B2
(45) Date of Patent: Aug. 19, 2008

(54) MOTOR DRIVE APPARATUS AND METHOD AND ELECTRICALLY DRIVEN BRAKE APPARATUS

(75) Inventors: Masataka Sasaki, Hitachi (JP); Hideki Miyazaki, Hitachi (JP); Toshiyuki Ajima, Tokai-mura (JP); Hiroyuki Saito, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 11/654,527

(22) Filed: Jan. 18, 2007

(65) Prior Publication Data
US 2007/0200523 A1 Aug. 30, 2007

(30) Foreign Application Priority Data
Feb. 27, 2006 (JP) ............................. 2006-049484

(51) Int. Cl.
*H02P 3/00* (2006.01)
*H02P 3/18* (2006.01)

(52) U.S. Cl. .................. 318/375; 318/362; 318/400.01; 318/700

(58) Field of Classification Search ................. 318/362, 318/375, 400.01, 400.2, 700
See application file for complete search history.

(56) References Cited

U.S. PATENT DOCUMENTS

| | | | | |
|---|---|---|---|---|
| 4,743,815 A | * | 5/1988 | Gee et al. .............. | 318/400.11 |
| 5,481,166 A | * | 1/1996 | Moreira .................. | 318/400.04 |
| 6,128,436 A | * | 10/2000 | Bos et al. ..................... | 388/815 |
| 6,281,656 B1 | * | 8/2001 | Masaki et al. ............... | 318/700 |
| 6,528,967 B2 | * | 3/2003 | Hallidy ....................... | 318/808 |
| 6,570,353 B2 | | 5/2003 | Krotsch et al. | |
| 6,873,126 B2 | * | 3/2005 | Inao et al. .............. | 318/400.28 |
| 7,102,306 B2 | * | 9/2006 | Hamaoka et al. ....... | 318/400.01 |
| 7,102,322 B2 | * | 9/2006 | Suzuki ....................... | 318/801 |
| 7,271,557 B2 | * | 9/2007 | Ajima et al. ........... | 318/400.01 |

FOREIGN PATENT DOCUMENTS

| | | |
|---|---|---|
| JP | 11-257389 | 9/1999 |
| JP | 2000-316291 | 11/2000 |
| JP | 2002-223580 | 8/2002 |

* cited by examiner

*Primary Examiner*—Taghi T. Arani
*Assistant Examiner*—Thai T Dinh
(74) *Attorney, Agent, or Firm*—Crowell & Moring LLP (57) ABSTRACT

In such a product that torque of a motor is continuously generated when a rotation number of the motor is nearly equal to zero, since an output voltage is kept at a constant value in accordance with a rotation position of the motor, such a condition that currents are concentrated in a specific element are maintained. As a result, a temperature of the specific element is increased, so that there are problems that a temperature fail of an inverter apparatus may readily occur, and thus, lifetimes of elements are lowered. In a power converter of a motor drive apparatus, windings are energizing-controlled in such a manner that only 1 phase of a switching circuit is pulse-width-controlled when the motor is under motor locking condition.

9 Claims, 5 Drawing Sheets

| MODE | ELECTRIC ANGLE | S1 | S2 | S3 | S4 | S5 | S6 |
|---|---|---|---|---|---|---|---|
| M1 | 15 ~ 45° | ON | OFF | OFF | PWM | ON | OFF |
| M2 | 45 ~ 75° | PWM | OFF | OFF | ON | OFF | OFF |
| M3 | 75 ~ 105° | PWM | OFF | OFF | ON | OFF | ON |
| M4 | 105 ~ 135° | ON | OFF | OFF | OFF | OFF | PWM |
| M5 | 135 ~ 165° | ON | OFF | ON | OFF | OFF | PWM |
| M6 | 165 ~ 195° | OFF | OFF | PWM | OFF | OFF | ON |
| M7 | 195 ~ 225° | OFF | ON | PWM | OFF | OFF | ON |
| M8 | 225 ~ 255° | OFF | PWM | ON | OFF | OFF | OFF |
| M9 | 255 ~ 285° | OFF | PWM | ON | OFF | ON | OFF |
| M10 | 285 ~ 315° | OFF | ON | OFF | OFF | PWM | OFF |
| M11 | 315 ~ 345° | OFF | ON | OFF | ON | PWM | OFF |
| M12 | 345 ~ 15° | OFF | OFF | OFF | PWM | ON | OFF |

FIG.7

FIG.8 ously stopped (such a condition that either rotation angular velocity or rotation number of motor becomes smaller than, or equal to very small value, which involves rotation stopping condition). Such a condition will be referred to as a "motor locking" state.

MOTOR DRIVE APPARATUS AND METHOD AND ELECTRICALLY DRIVEN BRAKE APPARATUS

BACKGROUND OF THE INVENTION

The present invention is related to a motor drive apparatus and method, and an electrically-driven brake apparatus.

Recently, while motors have been employed in various sorts of fields, generally speaking, constructions and control contents as to these motors are made different from each other, depending upon characteristics of objects which should be driven by the motors. There are many sorts of purposes, for instance, high speed rotations of motors are major purposes; precise rotation numbers of motors at low speeds are purposes; magnitude of rotation torque of motors constitutes important aspects; torque of motors at low speeds constitutes important aspects, and the like. Therefore, constructions and controls of motors are selected based upon purposes thereof. For example, rotation speeds of motors may constitute important aspects, whereas magnitude of torque in such a drive region that rotation numbers of motors becomes nearly zero may constitute important aspects.

As the latter example, there is such an electrically-driven brake apparatus having the following structure (refer to, for instance, JP-A-11-257389): That is, while a motor is provided in a brake apparatus of an automobile, rotation power of the motor is converted into depression force along a shaft direction, so that braking force is applied via a friction pad to a rotary disk of the automobile.

As the above-described motors, 3-phase AC motors, or multi-phase AC (Alternating Current) motors such as permanent magnet brushless motors are employed many times, in which AC voltages are used as power supply voltages. The motors use inverter apparatuses including a plurality of switching elements in order to apply the AC voltage thereto. In general, switching elements of inverter apparatuses are ON/OFF-controlled based upon a sine wave pulse width modulation control operation. The sine wave pulse width modulation control operation corresponds to such a method for controlling ON/OFF timing and ON/OFF pulse widths of all of the switching elements in such a manner that output voltages of the inverter apparatus become sine waveforms, while all of these switching elements are continuously turned ON/OFF.

However, in the above-exemplified electrically-driven brake apparatus, since the friction pad is depressed to the rotation disk by converting the rotation power of the motor into the depression force, under such a condition that a depression gap becomes zero and the braking force is maintained, the predetermined constant voltage is outputted while the rotation of the motor remains substantially stopped (such a condition that either rotation angular velocity or rotation number of motor becomes smaller than, or equal to very small value, which involves rotation stopping condition). Such a condition will be referred to as a "motor locking" state.

In this case, when the braking force is applied, the rotation number of the motor is nearly equal to "0 (zero)." However, in order to maintain the braking force, the motor is required to continuously output such a torque whose magnitude is larger than, or equal to the predetermined magnitude. When the motor is rotated, since the inverter output voltages are changed in the periodic manner, heat generations of the switching elements are averaged, whereas when the motor is locked, in order to keep the inverter output voltages to the constant values in accordance with the rotation positions of the motor, such a condition is held that currents are concentrated to flow through a specific element. More specifically, if the currents are concentrated to the specific element, then the temperature of this specific element is increased. As a result, a temperature fail of the inverter apparatus may readily occur. Therefore, there is such a problem that lifetimes of the elements are lowered, and the like.

Also, since there are many limitations as to installation spaces of motor drive apparatus for automobile auxiliary machines, such active cooling methods as water cooling methods and forcible air cooling methods are not employed, but in order to reduce the motor drive apparatus, lowering of loss of the motor drive apparatus constitutes the necessary condition.

SUMMARY OF THE INVENTION

In order to solve the above-explained problems, windings are energizing-controlled in such a manner that only 1 phase of a switching circuit is controlled in a pulse width modulation control operation when a motor is under locking state.

In accordance with the present invention, entire loss of the apparatus can be reduced, a possibility that a temperature fail of the apparatus occurs can be lowered, and thus, lifetimes of the elements can be improved.

Other objects, features and advantages of the invention will become apparent from the following description of the embodiments of the invention taken in conjunction with the accompanying drawings.

DETAILED DESCRIPTION OF THE INVENTION

It should be noted that while an electrically-driven brake will be exemplified which employs a motor having a 3-phase winding as a stator, the present invention is not limited only to the 3-phase motor, but may be applied to motors with employment of multi-phase windings based upon a similar basic idea thereof. Also, the present invention is not limited only to electrically-driven brakes for automobiles, but may be applied to other general-purpose actuators.

Figure 1:
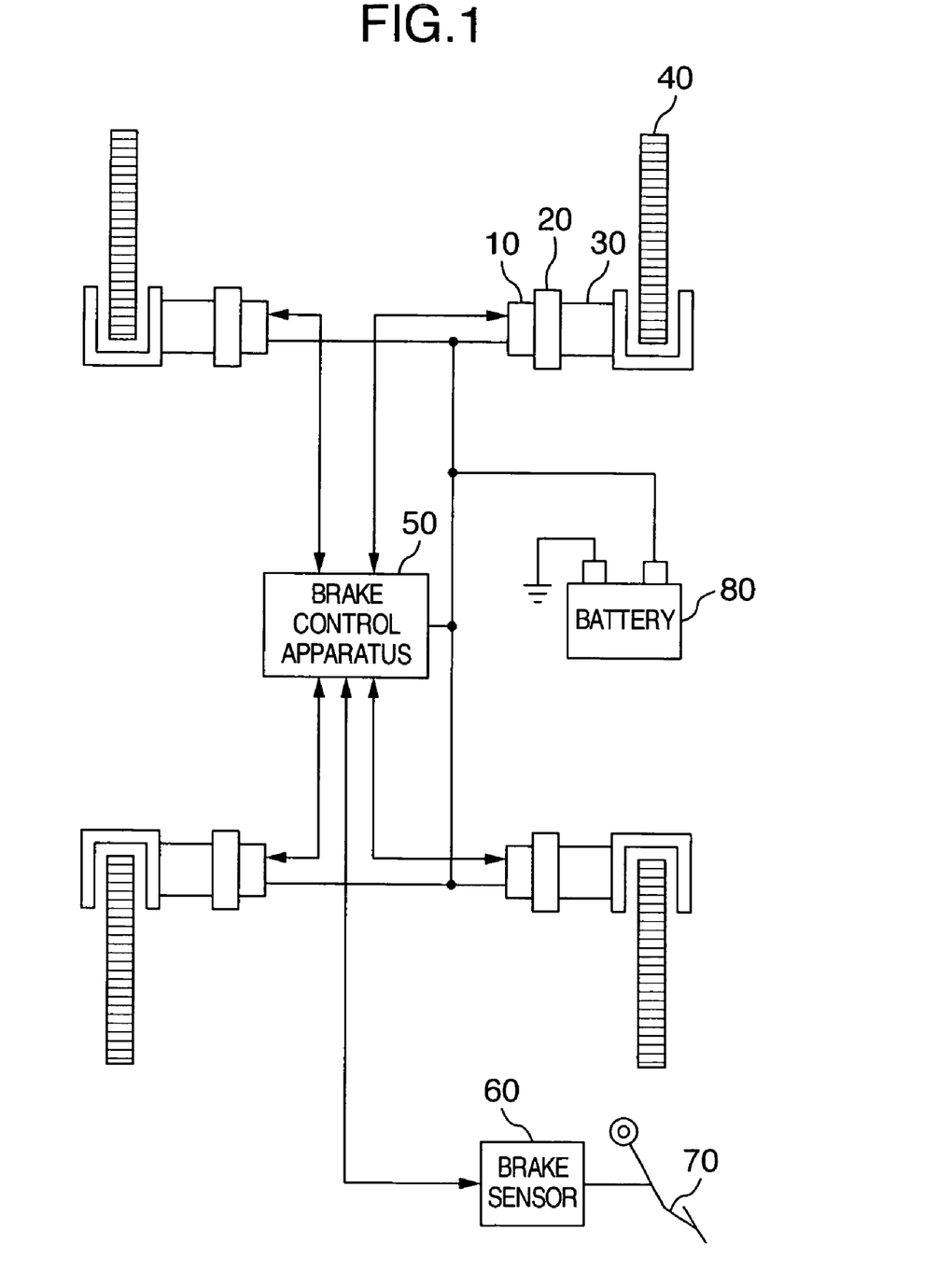
FIG. 1 is a diagram for schematically showing a system of an electrically-driven brake apparatus on which a motor drive apparatus according to an embodiment of the present invention is mounted.

FIG. 1 is a diagram for schematically showing a system of an electrically-driven brake apparatus 30 on which a motor drive apparatus according to an embodiment of the present invention is mounted.

The electrically-driven brake apparatus 30 corresponds to such an apparatus that rotation force of a motor 20 constructed of, for example, a permanent magnet brushless motor is converted into depression force of a piston so as to depress a disk brake 40 by way of a pad (not shown) and the like. A motor drive apparatus 10 has been mounted to the motor under integral condition.

A buttery 80 supplies electric power to the respective motor drive apparatuses 10 and a brake control apparatus 50. A description is made of operations as to an electrically-driven brake system. When a car driver pedals a brake pedal 70, a brake sensor 60 reads out braking force required by the car driver and then transfers the braking force required by the car driver to the brake control apparatus 50.

The brake control apparatus 50 calculates braking force instruction values of the respective brake apparatuses based upon the braking force required by the car driver, and then, transfers the calculated braking force instruction values to the motor drive apparatus 10 of each of the brake apparatuses.

The motor drive apparatus 10 applies a proper drive voltage to the motor 20 in accordance with the braking force instruction value. The drive voltage corresponds to, for instance, a 3-pahse AC voltage which has been modulated in a pulse width modulating (PWM) manner.

Since the dive voltage is applied to the motor 20, the motor 20 is rotated. Thus, rotation force of the motor 20 is converted into direct acting thrust by a rotation/direct action converting apparatus (not shown), for example, the motor rotation force is converted into the direct acting thrust for depressing the disk brake 40 by a ball screw, and a ball-and-ramp mechanism. The direct acting force depresses the disk brake 40 so as to produce braking force.

Figure 2:
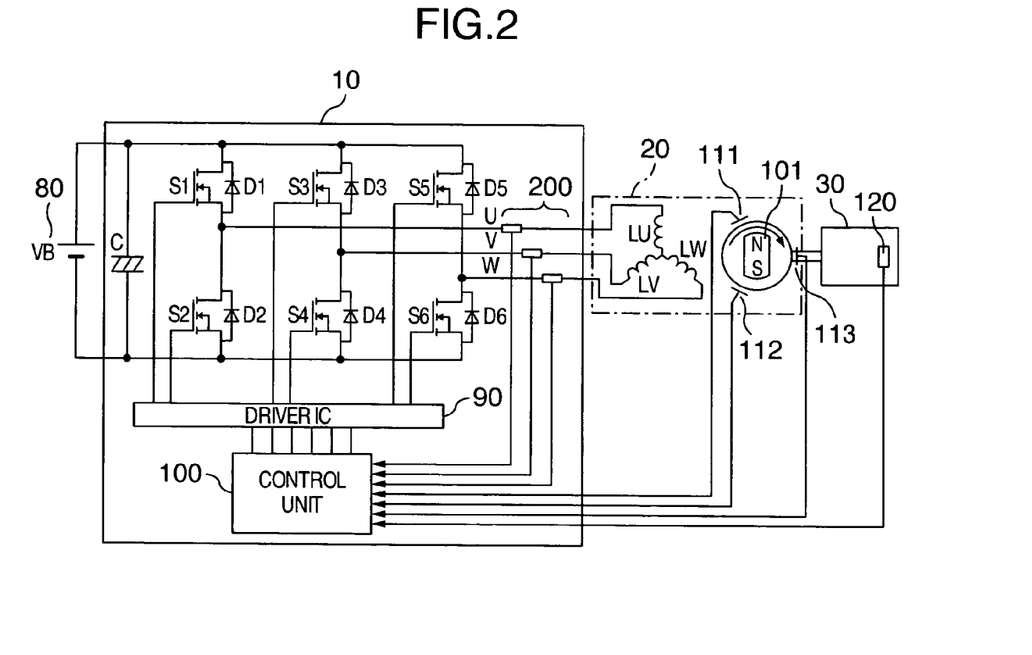
FIG. 2 is block diagram for representing a circuit arrangement of the motor drive apparatus shown in FIG. 1, and a peripheral unit thereof.

FIG. 2 is a block diagram for schematically indicating an arrangement of the motor drive apparatus 10 shown in FIG. 1, and a peripheral unit thereof.

The motor drive apparatus 10 is arranged by a power converting circuit, a driver IC 90, and a control unit 100. The power converting circuit is constituted by a plurality of switching elements provided for 3 phases, while 2 pieces of these switching elements are employed as 1 phase. The driver IC 90 drives the above-explained switching elements. The control unit 100 transfers ON/OFF instructions of switching elements to the driver IC 90. It should also be understood that although a switching element of FIG. 2 indicates an MOS-FET, this switching element may be alternatively arranged by combining an IGBT (Insulated Gate Bipolar Transistor) with a diode.

The control unit 100 calculates ON/OFF timing of the switching elements S1 to S6 based upon an output current of the power converting circuit, depression force to the disk brake 40, and magnetic pole positional information of a rotor 101 of the motor 20 in addition to the braking force instruction value from the brake control apparatus 50. Then, the control unit 100 controls to turn ON/OFF the switching elements S1 to S6 via the driver IC 90. The output current of the power converting circuit is acquired from a signal derived from a current sensor 200 which is provided on connection lines from the current converting circuit to the motor 20. The magnetic pole positional information as to the rotor 101 of the motor 20 derived from position sensors 111, 112, and 113 is acquired by detecting, or predicting magnetic pole positional information of this motor rotor 101.

Figure 3:
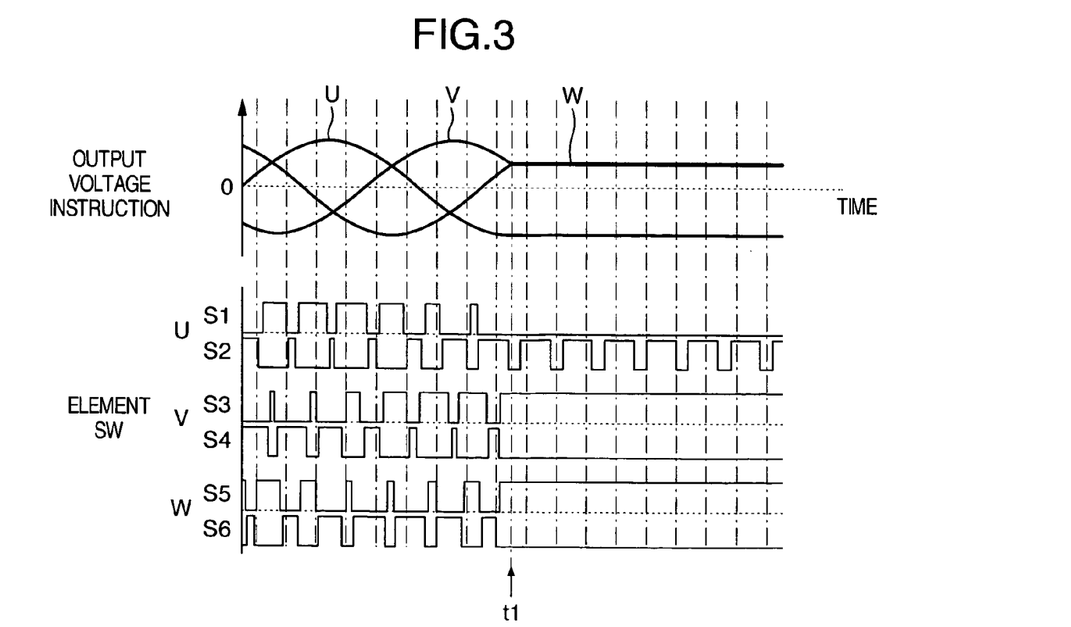
FIG. 3 graphically indicates instruction output voltages and ON/OFF patterns of respective switching elements before/after a motor locking operation is carried out in the example of FIG. 1.

FIG. 3 indicates instruction output voltages and ON/OFF patterns of the respective switching elements S1 to S6 before/after a motor locking operation is carried out in the example of FIG. 1.

In a time period up to a time "t1" of FIG. 3, since the motor 20 is rotated, all of the switching elements S1 to S6 are repeatedly turned ON/OFF in response to output voltage instructions by way of, for instance, a sine wave pulse width modulating control operation.

At timing of the above-described time "t1", a rotation number of the motor 20 becomes nearly equal to zero, namely this timing corresponds to such a timing that the motor 20 is locked. In the case that the motor is locked, a constant voltage is continuously outputted in response to a torque instruction value and a magnetic pole position. In this drawing, the voltage instruction is fixed in such a manner that plus voltages are outputted in a V phase and a W phase, whereas a minus voltage is outputted in a W phase.

In this embodiment, when the motor 20 is locked, the pulse width modulating control operation is carried out only in one phase among the U phase, V phase, and W phase. In FIG. 3, after the time "t1" when the motor 20 is locked, the switching element S1 is fixed to be turned OFF; the switching element S3 is fixed to be turned ON; the switching element S4 is fixed to be turned OFF; the switching element S5 is fixed to be tuned ON; and the switching element S6 is fixed to be turned OFF, whereas only the switching element S2 is pulse-width-modulated.

A description is made of flow directions as to currents after the time "t1" of FIG. 3. A current derived from a power supply "VB" flows from the switching element "S3" via a motor stator winding "LV" and another motor stator winding "LU" to the switching element "S2", and at the same time, from the switching element "S5" via a motor stator winding "LW" and another motor stator winding "LU" to the switching element "S2." All of the currents flowing from the switching elements "S3" and "S5" into the motor stator windings pass through the switching element "S2" and then are returned to the power supply "VB." As a result, the currents which are supplied to the motor stator windings of the 3 phases can be controlled only by the pulse width modulation of the switching element "S2", namely only one-phase modulation.

Comparing with the control method in which all of the elements are switched, in this embodiment, only one switching element is present when the motor 20 is locked. As a result, the entire loss of the switching elements S1 to S6 employed in the motor drive apparatus 10 can be reduced, and thus, a power converting efficiency can be improved.

Figure 4:
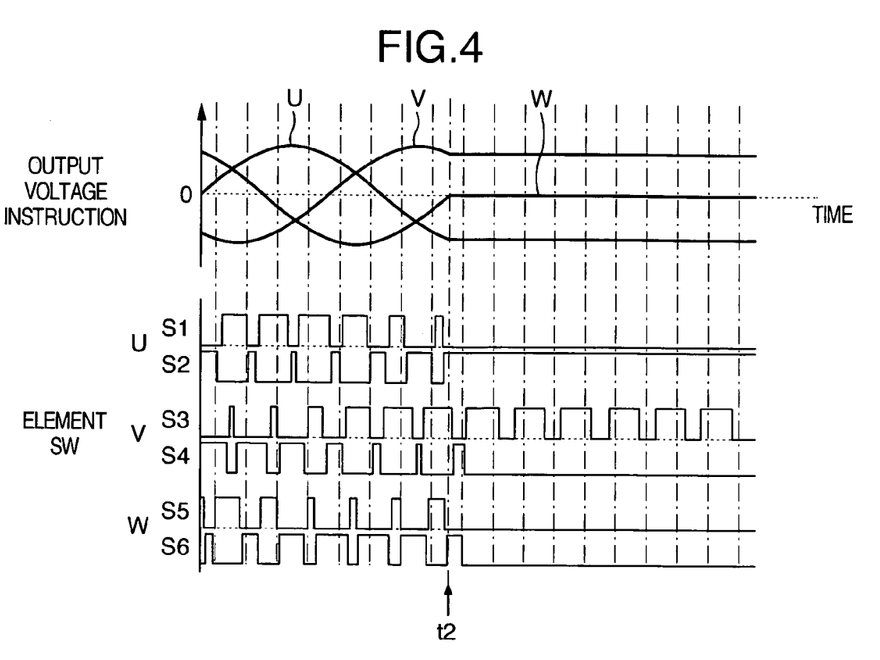
FIG. 4 graphically shows such waveforms that 1-phase modulation and 2-phase energizing operation are performed in relation to electric angles of a rotor of the motor when the motor locking operation is carried out in the example of FIG. 1.

FIG. 4 graphically shows such waveforms that 1-phase modulation and 2-phase energizing operation are performed in relation to electric angles of the rotor 101 of the motor 20, when the motor locking operation is carried out in the example of FIG. 1.

In FIG. 4, after a time "t2" when the motor 20 is locked, the switching element S1 is fixed to be turned OFF; the switching element S2 is fixed to be turned ON; the switching element S4 is fixed to be turned OFF; the switching element S5 is fixed to be turned OFF; and the switching element S6 is fixed to be turned OFF, whereas only the switching element S3 is pulse-width-modulated.

A description is made of flow directions as to currents after the time "t2" of FIG. 4. A current derived from the power supply "VB" flows from the switching element "S3" via the motor stator winding "LV" and another motor stator winding "LU" to the switching element "S2." Since both the switching elements S5 and S6 are fixed to be turned OFF, the currents energized to the stator windings of 2 phases are controlled by way of the 1-pahse modulation.

As shown in FIG. 3 and FIG. 4, a difference in energizing patterns caused by the positions of the electric angles of the rotor 101 of the motor 20 will be explained with reference to FIG. 5A and FIG. 5B.

Figure 5A:
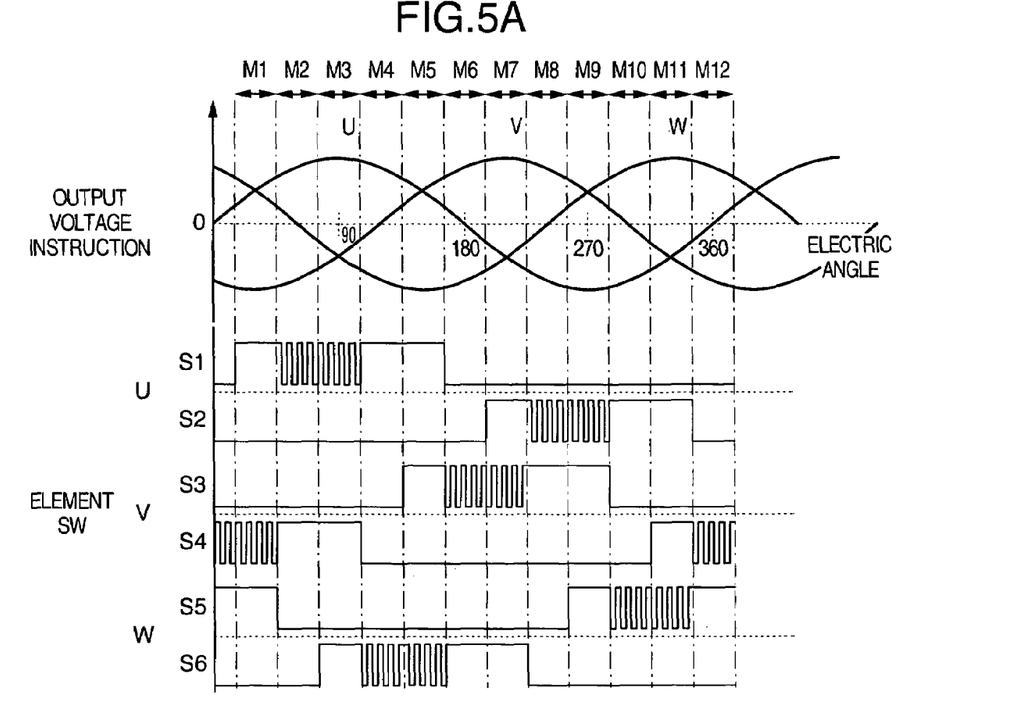
FIG. 5A and FIG. 5B show energizing patterns during the motor locking condition with respect to the electric angles of the rotor of the motor in the example of FIG. 1.
Figure 5B:
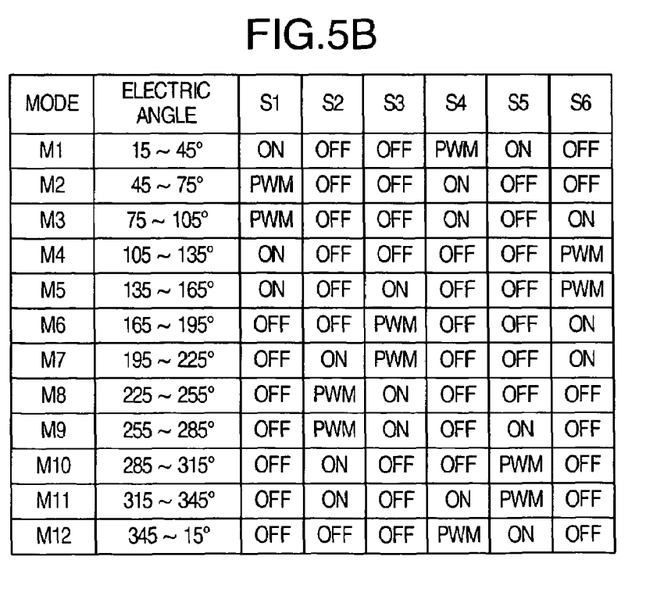

FIG. 5A and FIG. 5B show energizing patterns during the motor locking condition with respect to the electric angles of the rotor 101 of the motor 20 in the example of FIG. 1.

While an electric angle of 360 degrees is subdivided into 12 modes ("M1" to "M12"), energizing patterns of the switching elements S1 to S6 in each of the 12 modes indicate any of "ON", "OFF", and a pulse width modulation (PWM). The electric angles are described while a U-phase voltage is defined as a reference. In the 12 modes, the electric angles have been set in such a manner that energizing phases of 2 phase and 3 phase alternately appear.

The mode M1 has been set within a range before/after a crest value of a V-phase voltage by an angle of 15 degrees, assuming now that both a U-phase voltage and a W-phase voltage are equal to each other along a plus direction, and only the V-phase voltage is directed to a minus direction. In the mode M1, the switching elements S2, S3, S6 are fixed to be turned OFF; the switching elements S1, S5 are fixed to be turned ON; and the switching element S4 is PWM-controlled, so that a 1-phase modulation and 3-phase energizing operation are realized.

The mode M2 has been set within a range before/after a zero cross point of a W-phase voltage by an angle of 15 degrees, assuming such a relationship that the W-phase voltage is zero, and a U-phase voltage=−(V-phase voltage). In the mode M2, the switching elements S2, S3, S5, S6 are fixed to be turned OFF; the switching element S4 is fixed to be turned ON; and the switching element S1 is PWM-controlled, so that a 1-phase modulation and 2-phase energizing operation are carried out in which the current flows from the U-phase to the V-phase.

It should also be noted that even when the switching element which is PWM-modulated is changed into the switching element S4 and the switching element S1 is fixed to be turned ON, a current may be similarly controlled.

Subsequently, the modes M3 to M12 have constituted energizing patterns which are resembled to the previous 2 modes. In this embodiment, since the ranges of the 12 modes represented in FIG. 5A and FIG. 5B are set, the combinations between the 3-phase energizing mode by the 1-phase modulation, and the 2-phase energizing mode by the 1-phase modulation may be realized, and the locking torque of the motor 20 may be effectively outputted within such a range that the electric angle is divided by 12.

Next, a description is made of a method for judging a locking operation of the motor 20.

Figure 6:
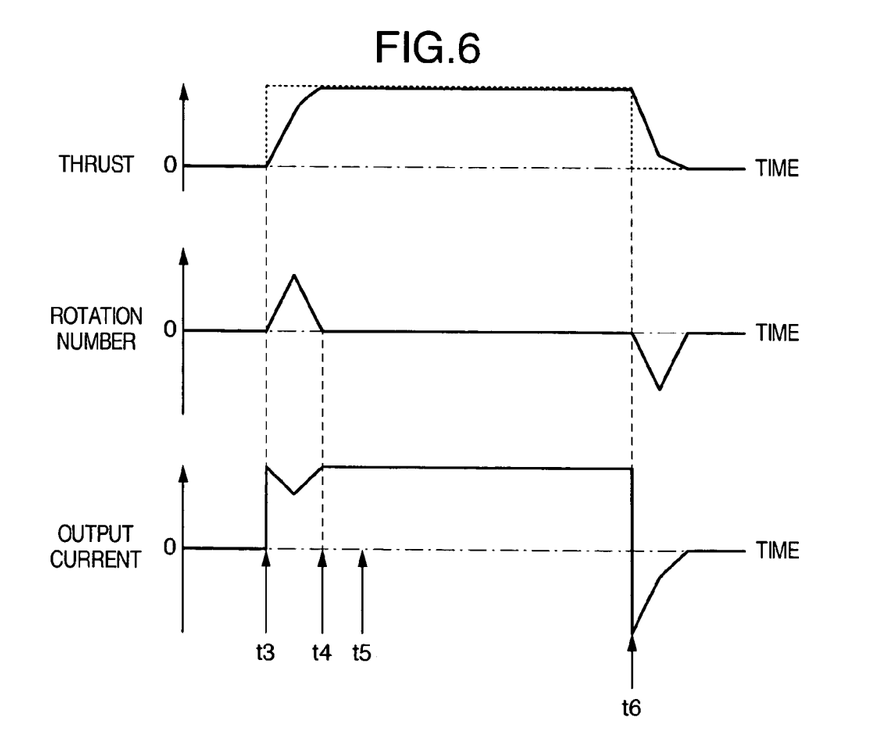
FIG. 6 graphically represents a relationship among thrust, a rotation number of the motor, and an output current of the motor drive apparatus in the example of FIG. 1.

FIG. 6 graphically represents a relationship among thrust, a rotation number of the motor 20, and an output current of the motor drive apparatus 10 in the example of FIG. 1.

An actual thrust value is acquired from a thrust value acquiring means which acquires to either detect or predict direct acting thrust information. In this embodiment, an actual thrust value is calculated based upon a signal derived from a thrust sensor (shown in FIG. 2) which corresponds to the above-described thrust value acquiring means; a rotation number of the motor 20 is acquired from position sensors 111 to 113 which correspond to position acquiring means; and an output current is acquired from a current sensor 200 which corresponds to a current value acquiring means.

When a thrust instruction is inputted at a time "t3" and the thrust instruction is issued in the case that the car driver starts to actuate the brake, namely is calculated from the braking force instruction value, a current is outputted from the motor drive apparatus 10, so that the motor 20 is rotated. Although the rotation number of the motor 20 is increased in connection with the thrust instruction, when the brake pad is contacted to the disk brake 40, the rotation number of the motor 20 is decreased and becomes nearly equal to a speed of "0" at a time "t4." At the time "t4", when the motor 20 becomes the zero speed, the actual thrust is approximated to the thrust instruction value and the output current becomes constant after the time "t4."

At the time "t4", the rotation number of the motor 20 becomes zero and the motor 20 is locked. Before the motor lock judging operation, the sine wave pulse width control operation is carried out, whereas after the motor lock judging operation, the sine wave pulse width control operation is switched to the 1-phase modulation control operation. In order to relax shocks occurred when the control operation is switched, it is preferable to employ such a method that a judgement of the motor locking condition is made at a time "t5" slightly elapsed from the time "t4" at which the rotation number of the motor 10 becomes zero and the actual thrust value is approximated to the thrust instruction value and at this time "t5", the sine wave pulse width control operation is switched to the 1-phase modulation control operation.

At a time "t6" when the car driver starts to release the braking operation, namely the thrust instruction becomes zero, the 1-phase modulation control operation is swiftly switched to the sine wave pulse width control operation so as to release the braking operation in a better response characteristic.

Since the above-described control operation is carried out, while the response characteristic of the motor drive apparatus 10 can be maintained, the losses of the motor drive apparatus 10 employed in the electrically-driven brake apparatus can be reduced, so that the motor drive apparatus 10 can be operated in a high efficiency.

Embodiment 2

Figure 7:
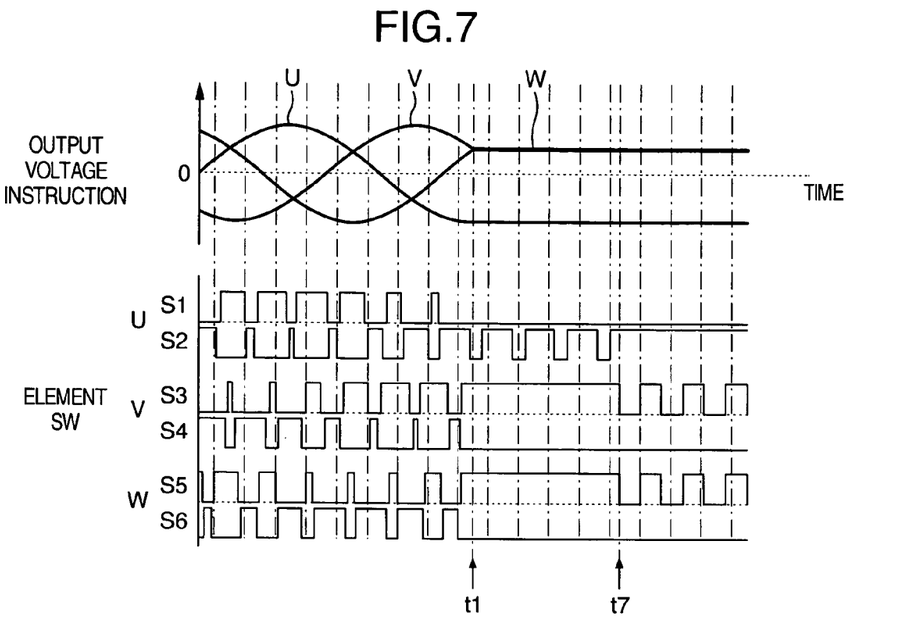
FIG. 7 graphically shows ON/OFF control operations of switching elements performed in a motor drive apparatus according to another embodiment of the present invention.

FIG. 7 represents ON/OFF control operations of the switching elements S1 to S6, which constitute another embodiment of the present invention.

Similar to FIG. 3, at a time "t1" when a locking condition of the motor 20 is judged, the sine wave pulse width modulation control operation is switched to the 1-phase modulation control operation, so that only the switching element S2 is energizing-controlled by way of the pulse width modulation.

When the switching element S2 is turned OFF, a circulating current flows through a stray diode of the switching element S1. As a result, even when the motor 20 is locked, both the switching elements S1 and S2 generate heat. Due to a relationship between the switching period and the energizing time of the switching element S1, since there is such a case that the heat generation of the switching element S2 under the pulse width control operation becomes larger than the heat generation of the switching element S1, at a time "t7", a control operation for switching the modulation phase is carried out. In other words, the switching element S2 is fixed to be turned ON, and both the switching elements S3 and S5 are controlled by way of the pulse width modulation, so that both the voltages and the currents when the motor 20 is locked are controlled.

As previously explained, since the modulation phase is switched, the switching loss component of the switching element S2 can be reduced.

It should also be noted that the timing of the time "t7" may be preferably determined in such a manner that the heat generations of the respective switching elements S1 to S6 are calculated, and the heat generations are dispersed.

As previously explained, in such a case that the heat generations of the switching elements S1 to S6 are deviated in the 1-phase modulation control operation, since the modulation phase is switched while the motor 20 is being locked, the heat generations among the switching elements S1 to S2 can be averaged. As a result, long lifetimes of the switching elements S1 to S6 can be achieved, namely, a long lifetime of the motor drive apparatus 10 can be achieved.

Embodiment 3

Figure 8:
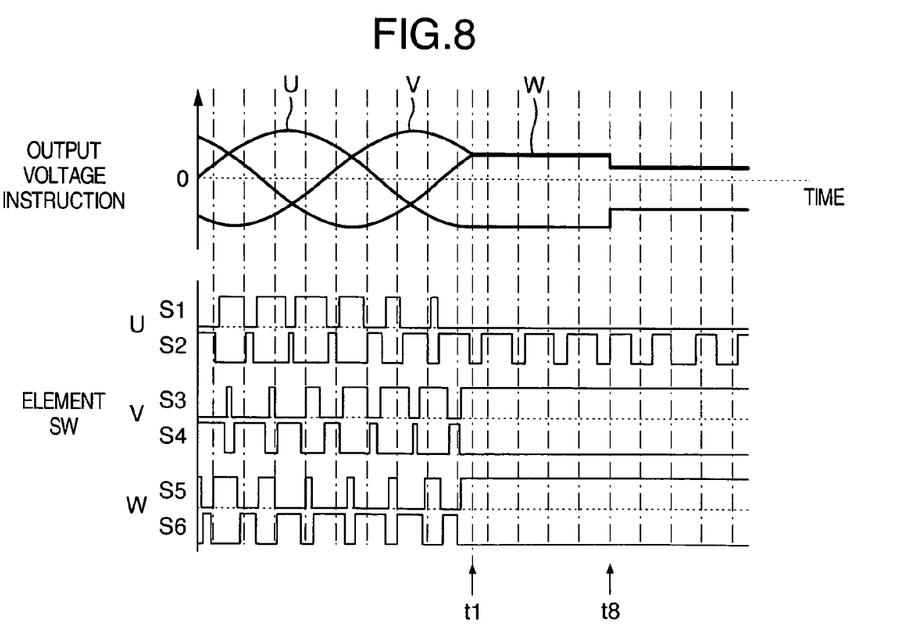
FIG. 8 graphically indicates ON/OFF control operations of switching elements performed in a motor drive apparatus according to another embodiment of the present invention.

FIG. 8 represents ON/OFF control operations of the switching elements S1 to S6, which constitute another embodiment of the present invention. In this embodiment, such an example is indicated that when a thrust instruction is varied (decreased) during locking condition of the motor 20, an energizing width is changed.

Similar to FIG. 3, FIG. 8 shows such a case that at a time "t1" when a locking condition of the motor 20 is judged, the sine wave pulse width modulation control operation is switched to the 1-phas modulation control operation after the time "t1." Assuming now that a brake instruction is lowered at a time "t8", an output voltage instruction is also reduced, so that the pulse width modulation is changed from a pulse width "W1" to another pulse width "W2." In order to reduce motor torque while the motor 20 is locked, the pulse width may be decreased. As a result, in the electrically-driven brake apparatus, the torque of the motor 20 can be controlled by varying the pulse width.

As previously explained, in accordance with this embodiment, the heat generation loss in the motor drive apparatus 10 can be reduced, so that if the motor drive apparatus 10 is applied to an automobile which actuates a brake many times, then the brake can be continuously used for a long time.

In accordance with the motor drive apparatus of the present invention, the sine wave pulse width modulation control operation is switched to the 1-phase modulation control operation in which the pulse width modulation control operation is carried out only for 1 phase when the motor is locked. As a result, in the motor drive apparatus in which the motor locking conditions occur many times, the loss of the entire apparatus can be reduced. As a consequence, since the loss is reduced, the possibility that the temperature fail of the motor drive apparatus occurs can be reduced, and thus, the element lifetimes can be improved.

While the present invention has explained the 1-phase modulation control operation executed when the motor is locked in the electrically-driven brake apparatus, the present invention may be applied to an electrically-driven actuator other than the electrically-driven brake. Since the heat generation loss occurred in the motor drive apparatus is reduced, for example, there is such a preferable application example of the motor drive apparatus of the present invention. That is, while a regenerative brake of a drive motor of an automobile such as an electric car and a hybrid car in which drive motors are mounted on drive wheels is combined with the motor drive apparatus, a cooperation control operation is carried out for a long time. Also, the motor drive apparatus of the present invention may be alternatively applied to other automobile auxiliary machines. Furthermore, a similar effect may be achieved even in other apparatuses which are not related to an automobile if these apparatuses need to continuously generate torque under such a condition that rotations becomes zero, or nearly equal to zero.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. In a drive apparatus for driving a brushless motor which is constituted by at least a stator having windings of 3 phases and a rotor having a permanent magnet,
a motor drive apparatus comprising:
a switching circuit having a plurality of switching elements which energize said windings; and
a control unit for controlling energizing operations to said windings in such a manner that only 1 phase of the switching circuit is pulse-width-controlled when said brushless motor is brought into a motor locking condition.

2. A motor drive apparatus as claimed in claim 1 wherein:
said motor drive apparatus is further comprised of:
position acquiring means for acquiring positional information of said rotor; and wherein:
in the case that an applied voltage of 1 phase among voltages applied to said windings while the position of the rotor acquired from said position acquiring means is defined as a reference is approximated to a crest value thereof, said control unit performs a pulse width control operation in the switching circuit of said 1 phase, and maintains the switching circuits of other phases under ON states.

3. A motor drive apparatus as claimed in claim 2 wherein:
the applied voltage approximated to said crest value implies such a range that the applied voltage of said 1 phase is defined within an electric angle of 15 degrees before/after the position of said crest value.

4. A motor drive apparatus as claimed in claim 1 wherein:
said motor drive apparatus is further comprised of:
position acquiring means for acquiring positional information of said rotor; and wherein:
in the case that an applied voltage of 1 phase among voltages applied to said windings while the position of the rotor acquired from said position acquiring means is defined as a reference is approximated to a zero, said control unit maintains the switching circuit of said 1 phase under an OFF state, performs a pulse width control operation in a switching circuit of any 1 phase among the switching circuits of other phases, and further, maintains the switching circuits of any other phases under ON states.

5. A motor drive apparatus as claimed in claim 4 wherein:
the applied voltage approximated to zero implies such a range that the applied voltage of said 1 phase is defined within an electric angle of 15 degrees before/after a position of zero.

6. A motor drive apparatus as claimed in claim 1 wherein:
said control unit switches the phase which is pulse-width-controlled when the motor is locked, and controls that only 1 phase of a winding within said windings is continuously pulse-width-controlled.

7. In a method for driving a brushless motor which is constituted by at least a stator having windings of 3 phases and a rotor having a permanent magnet,
a motor drive method wherein:

said windings are energizing-controlled in such a manner that only 1 phase of the switching circuit 10 is pulse-width-controlled when said brushless motor is brought into a motor locking condition.

8. An electrically-driven brake apparatus comprising:
a brushless motor which is constituted by at least a stator having windings of 3 phases and a rotor 101 having a permanent magnet;
a rotation/direct acting converting mechanism for converting a rotation of said brushless motor into direct acting thrust of a piston;
a mechanism for depressing a disk brake by way of thrust of said piston;
a switching circuit having a plurality of switching elements which energize said windings; and
a control unit for controlling energizing operations to said windings in such a manner that only 1 phase of the switching circuit is pulse-width-controlled when said brushless motor is brought into a motor locking condition.

9. An electrically-driven brake apparatus as claimed in claim 8 wherein:
said electrically-driven brake apparatus is further comprised of:
thrust value acquiring means for acquiring direct acting thrust information of said piston; and wherein:
in the case that a rotation number of said brushless motor is smaller than, or equal to a constant value, and also, the thrust value acquired from said thrust value acquiring means is larger than, or equal to a predetermined value, said control unit judges that said brushless motor is under motor locking state.

\* \* \* \* \*